United States Patent
Lee (10) Patent No.: US 6,188,727 B1
(45) Date of Patent: Feb. 13, 2001

(54) SIMPLICITY HDTV VIDEO DECODER AND ITS DECODING METHOD

(75) Inventor: Dong Ho Lee, Seoul (KR)

(73) Assignee: LG Electronics Inc., Seoul (KR)

( * ) Notice: Under 35 U.S.C. 154(b), the term of this patent shall be extended for 0 days.

(21) Appl. No.: 08/928,219

(22) Filed: Sep. 12, 1997

(30) Foreign Application Priority Data

Sep. 13, 1996 (KR) .................................. 96-39744

(51) Int. Cl.[7] .............................. H04N 7/12; H04N 11/02; H04N 11/04
(52) U.S. Cl. ...................................... 375/240.03; 348/416
(58) Field of Search .................................. 348/384, 401, 348/402, 404, 405, 415, 416; 382/166; 375/240.03, 240.23, 240.2; H04N 7/12, 11/02, 11/04

(56) References Cited

U.S. PATENT DOCUMENTS

| | | | |
|---|---|---|---|
| 4,943,847 | * | 7/1990 | Katznelson ............................. 358/12 |
| 5,027,206 | * | 6/1991 | Vreeswijk et al. .................... 358/141 |
| 5,093,720 | * | 3/1992 | Krause et al. ......................... 348/416 |
| 5,109,271 | * | 4/1992 | Borgers et al. ......................... 358/13 |
| 5,485,279 | * | 1/1996 | Yonemitsu et al. ................... 348/411 |
| 5,544,263 | * | 8/1996 | Iwamura ............................... 382/166 |
| 5,659,365 | * | 8/1997 | Wilkinson ............................ 348/416 |
| 5,703,646 | * | 12/1997 | Oda ....................................... 348/401 |

* cited by examiner

Primary Examiner—Howard Britton
Assistant Examiner—Nhon T Diep

(57) ABSTRACT

A simplicity HDTV video decoding method includes the steps of: variable-length-decoding an input image signal, and dividing it into a luminance signal, a color difference signal and a motion vector; reverse-quantizing each of the luminance and color difference signals received, and reverse-converting it to be half in horizontal size; and storing each of the reverse-converted luminance and color difference signals in the unit of frames, and motion-compensating it by using the motion vector, thus reducing the memory and other logic circuits in half by motion-compensating each of the luminance and color difference signals, generated in parallel by an 8×4 IDCT.

7 Claims, 6 Drawing Sheets

Horizontal 17 pixels

SIMPLICITY HDTV VIDEO DECODER AND ITS DECODING METHOD

BACKGROUND OF THE INVENTION

1. Field of the Invention

The present invention relates to a simplicity HDTV video decoder and its decoding method and, more particularly, to a simplicity HDTV video decoder and its decoding method by which a parallel decoding can be achieved respectively for luminance and color signals.

2. Discussion of Related Art

In American HDTV regulations, what are termed GA (Grand Alliance) HDTV system, the image compression and multiplex techniques are based on the MPEG-2 (Moving Picture Experts Group-2) regulations.

Various video formats are included; sequential scanning of 24 Hz and 30 Hz and interlaced scanning of 60 Hz with 1920×1080 pixels, and sequential scanning of 24 Hz, 30 Hz and 60 Hz with 1280×720 pixels. Theses video formats are based on the MPEG-2 regulations, and require large memories to realize a complete HDTV decoder.

As for a general HDTV receiver, human eyes do not sense a deterioration in the resolution even when the horizontal resolution of an image is reduced by half on a monitor which is less than 50 inches in size.

For that reason, a simplicity HDTV video decoder can be realized by reducing the horizontal video resolution and decreasing its memories.

Figure 1:
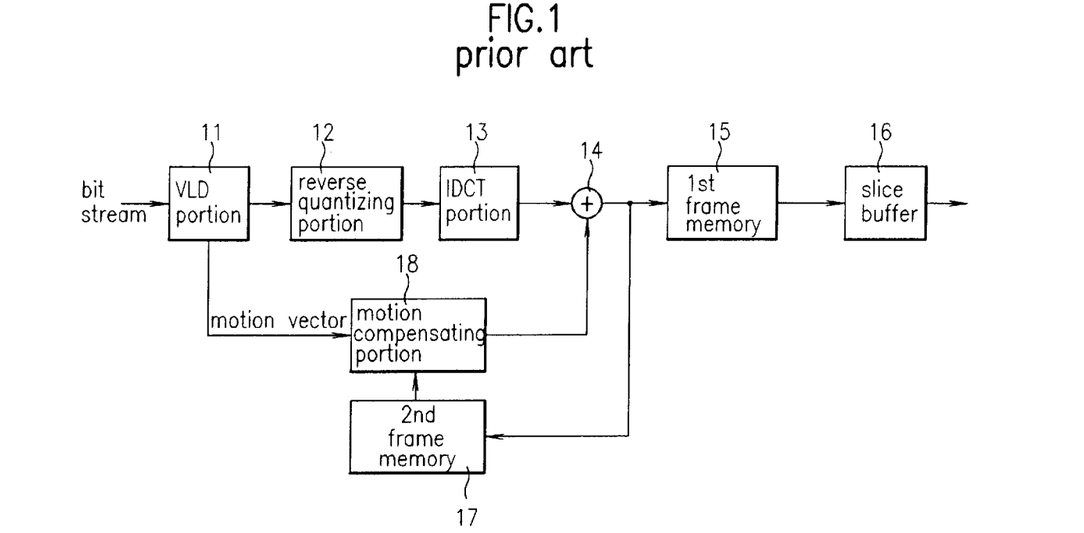
FIG. 1 is a block diagram of a general HDTV video decoder.

FIG. 1 is a block diagram of a general HDTV video decoder. Referring to FIG. 1, the HDTV video decoder comprises: a VLD (Variable Length Decoder) portion 11 for variable-length-decoding an input HDTV bit stream and dividing it into a motion vector, a luminance signal and a color difference signal; a reverse quantizing portion 12 for reverse-quantizing the count number transferred from the VLD portion 11; an IDCT (Inverse Discrete Cosine Transform) portion 13 for reverse-discrete-cosine-transforming the reverse-quantized count number, received from the reverse quantizing portion 12, in the unit of 8×8 blocks; an adding portion 14 for combining an image signal transferred from the IDCT portion 13 and a motion-compensated image signal; a first frame memory 15 of 3 Mb for converting the image signal transferred from the adding portion 14 in the unit of frames; a slice buffer 16 for generating the image signal transferred from the first frame memory 15 in the unit of lines; a second frame memory 17 for converting the image signal transferred from the adding portion 14 in the unit of frames; and a motion compensating portion 18 for motion-compensating the image signal transferred from the second frame memory 17 according to a motion vector from the VLD portion 11, transmitting it to the adding portion 14.

The divided motion vector is transferred into the motion-compensating portion 18, and the quantized value and the count number are fed into the reverse quantizing portion 12.

The reverse quantizing portion 12 reverse-quantizes the count number, received from the VLD portion 11, according to the quantized value. The reverse-quantized count number is restored to the image signal through an IDCT conversion in units of 8×8 blocks, and transferred into the adding portion 14.

The adding portion 14 combines the image signal transferred from the IDCT portion 13 and a signal pre-estimated by the second frame memory 17 through a motion compensation to restore the image signal into a complete image, generating it to the first frame memory 15.

The first frame memory 15 converts the image signal transferred from the IDCT portion 13 in the unit of frames and transmits the output to the slice buffer 16, which converts the image signal from the first frame memory 15 in the unit of lines.

The image signal generated by the adding portion 14 is converted by the second frame memory 17 of 6 Mb in the unit of frames. The motion compensating portion 18 compensates the image signal received from the second frame memory 17 according to the motion vector generated from the VLD portion 11, generating it to the adding portion 14.

Since the HDTV video decoder of the prior art decodes many pixels on one screen with an 8×8 IDCT, the data to be processed is large in size and requires larger logic circuits and memories.

SUMMARY OF THE INVENTION

Accordingly, the present invention is directed to a simplicity HDTV video decoder and its decoding method that substantially obviates one or more of the problems due to limitations and disadvantages of the related art.

An object of the present invention is to provide a simplicity HDTV video decoder and its decoding method by which decoder constructions and accumulated errors in a motion compensation can be minimized.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a simplicity HDTV video decoder includes: a variable length decoder portion for variable-length-decoding an input image signal and dividing it into a motion vector, a luminance signal and a color difference signal in parallel; a luminance signal processing portion for decoding the luminance component of an image by using the luminance signal and the motion vector that are separated; and a color difference signal processing portion for decoding the color difference component of the image by using the color difference signal and the motion vector that are separated.

A simplicity HDTV video decoding method includes the steps of: variable-length-decoding an input image signal, and dividing it into a luminance signal, a color difference signal and a motion vector; reverse-quantizing each of the luminance and color difference signals received, and reverse-converting it to be half in horizontal size; and storing each of the reverse-converted luminance and color difference signals in the unit of frames, and motion-compensating it by using the motion vector.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

Figure 2:
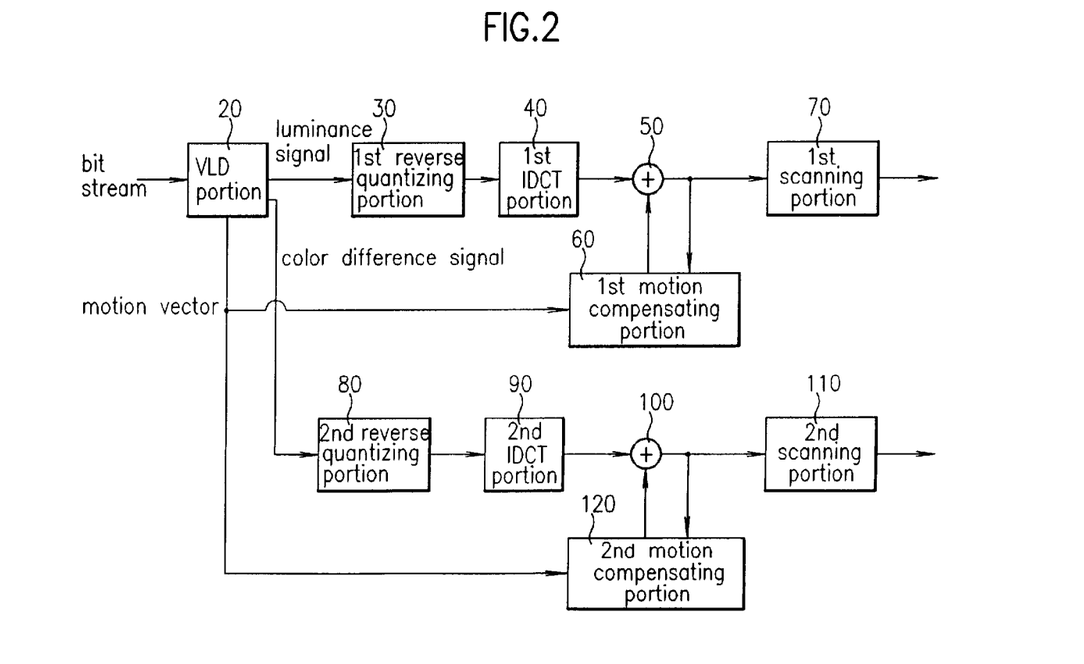
FIG. 2 is a block diagram of a simplicity HDTV video decoder in accordance with the present invention.
Figure 3:
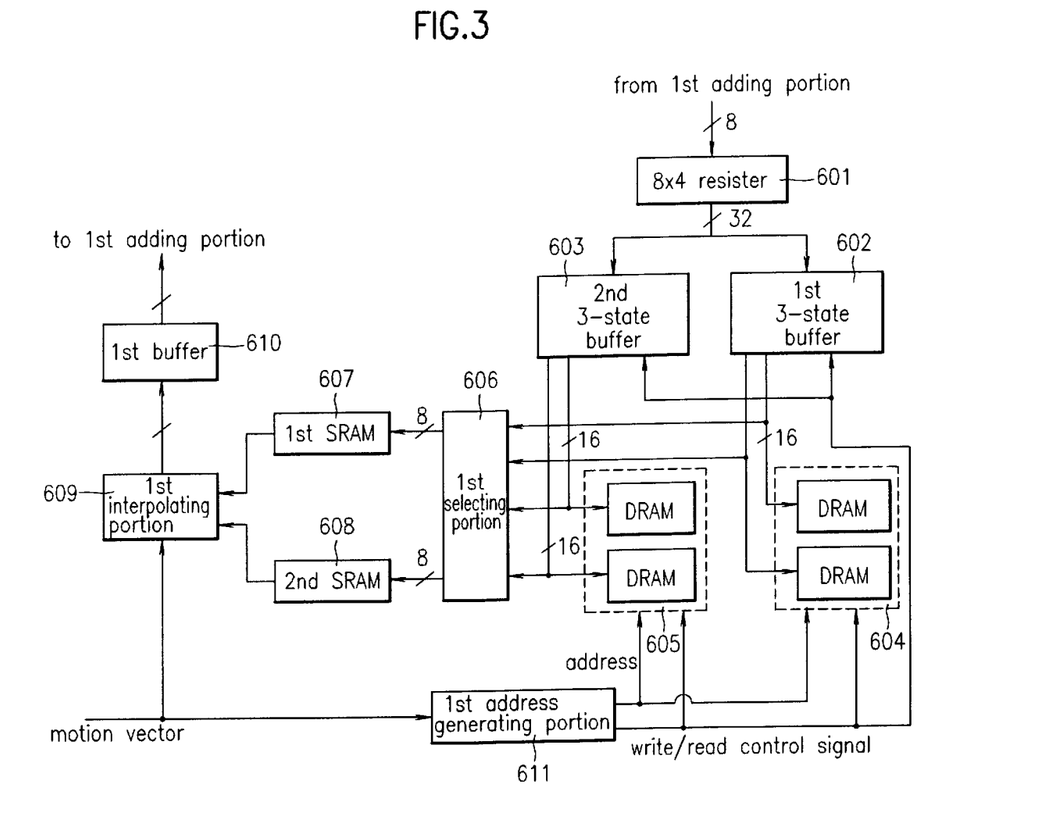
FIG. 3 is a detail block diagram of the first motion compensating portion as shown in FIG. 2.
Figure 4:
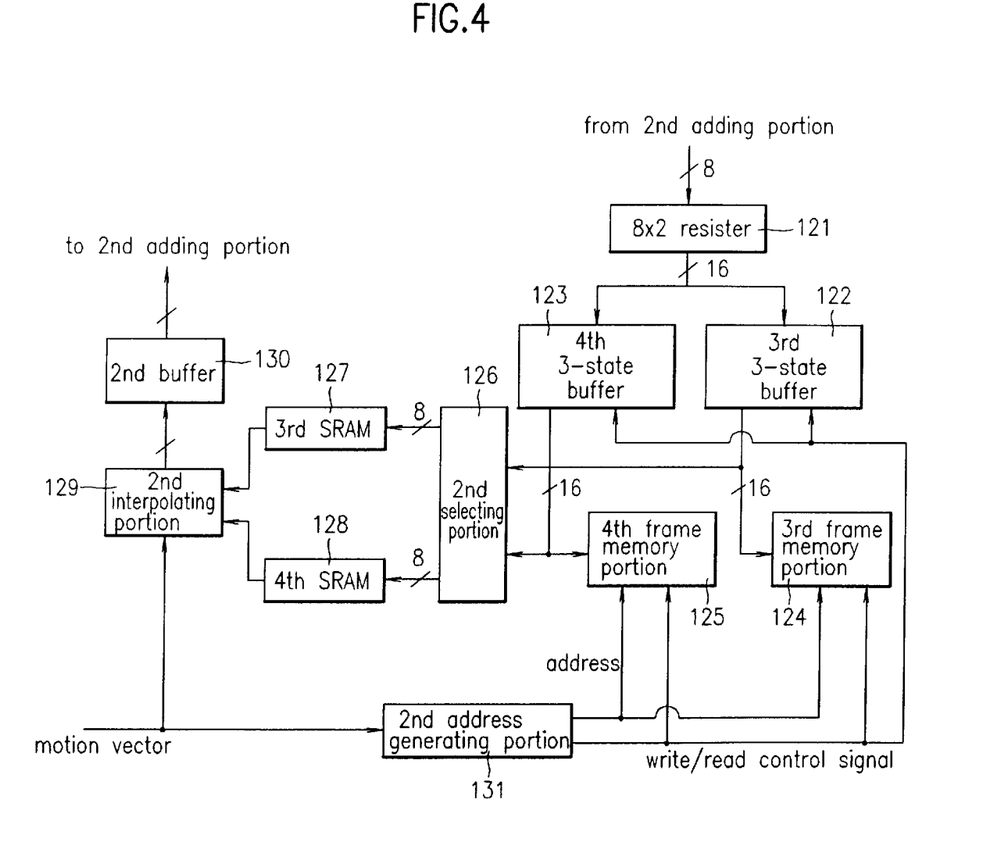
FIG. 4 is a detail block diagram of the second motion compensating portion as shown in FIG. 2.

FIG. 2 is a block diagram of a simplicity HDTV video decoder in accordance with the present invention. FIG. 3 and FIG. 4 are detail block diagrams of the first and second motion compensating portions as shown in FIG. 2, respectively.

Referring to FIG. 2, the HDTV video decoder comprises: a VLD (Variable Length Decoder) portion 20 for variable-length-decoding an input HDTV bit stream and dividing it into a motion vector, a luminance signal and a color difference signal; a first reverse quantizing portion 30 for reverse-quantizing the luminance signal transferred from the VLD portion 20; a first IDCT (Inverse Discrete Cosine Transform) portion 40 for reverse-discrete-cosine-transforming the reverse-quantized count number, received from the first reverse quantizing portion 30, in the unit of 8×4 blocks; a first adding portion 50 for combining the image signal transferred from the first IDCT portion 40 and a motion-compensated image signal; a first motion compensating portion 60 for converting the luminance signal transferred from the first adding portion 50 in the unit of frames, storing it, and motion-compensating the stored luminance signal according to the motion vector received from the VLD portion 20, transmitting it to the first adding portion 50; a first scanning portion 70 for scanning the image signal transferred from the first motion compensating portion 60 in the unit of lines; a second reverse quantizing portion 80 for reverse-quantizing the color difference signal transferred from the VLD portion 20; a second IDCT portion 90 for reverse-discrete-cosine-transforming the reverse-quantized count number, received from the second reverse quantizing portion 80, in the unit of 8×4 blocks; a second adding portion 100 for combining the image signal transferred from the second IDCT portion 90 and a motion-compensated image signal; a second motion compensating portion 120 for converting the color difference signal transferred from the second adding portion 100 in the unit of frames, storing it, and motion-compensating the stored color difference signal according to the motion vector received from the VLD portion 20, transmitting it to the second adding portion 120; and a second scanning portion 110 for scanning the image signal transferred from the second motion compensating portion 120 in the unit of lines.

As shown in FIG. 3, the first motion compensating portion 60 comprises: an 8×4 register 601 for storing the 8-bit luminance signal transferred from the first adding portion 50 by 4 pixels; an address generating portion 611 for generating a write/read control signal and an address by using the motion vector of pixel unit and the address of the macro block currently decoded; first and second three-state buffers 602 and 603 for storing the 32-bit signal transferred from the 8×4 register 601 according to the read/write control signal from the address generating portion 611; first and second frame memories 604 and 605 consisting of two DRAMs and storing the output signals of the first and second three-state buffers 602 and 603 according to the read/write control signal and the address transferred form the address generating portion 611, or generating the previously stored frame signal; a first selecting portion 606 receiving the signal of the first or second frame memories 604 or 605, and selectively generating pixels of odd and even numbered addresses; a first SRAM 607 for storing the odd-numbered address pixel transferred from the first selecting portion 606; a second SRAM 608 for storing the even-numbered address pixel transferred from the first selecting portion 606; a first interpolating portion 609 for interpolating the pixels of odd and even numbered addresses stored in the first and second SRAMs 607 and 608 according to the motion vector of a half or quarter pixel unit from the VLD portion 20; and a first buffer 610 for temporarily storing the signal interpolated by the first interpolating portion 609, and generating it to the first adding portion 50.

The second motion compensation 120, as shown in FIG. 4, comprises: an 8×2 register 121 for storing the 8-bit color difference signal transferred from the second adding portion 100 by 2 pixels; an address generating portion 131 for generating a write/read control signal and an address by using the motion vector of pixel unit and the address of the macro block currently decoded; third and fourth three-state buffers 122 and 123 for storing the 16-bit signal transferred from the 8×2 register 121 according to the read/write control signal received from the address generating portion 131; third and fourth frame memories 124 and 125 consisting of one DRAM and storing the output signals of the third and fourth three-state buffers 122 and 123 according to the read/write control signal and the address transferred from the address generating portion 611, or generating the previously stored frame signal; a second selecting portion 126 receiving the signal of the third and fourth frame memories 124 and 125, and selectively generating pixels of odd and even numbered addresses; a third SRAM 127 for storing the odd-numbered address pixel transferred from the second selecting portion 126; a fourth SRAM 128 for storing the even-numbered address pixel transferred from the second selecting portion 126; a second interpolating portion 129 for interpolating the pixels of odd and even numbered addresses stored in the third and fourth SRAMs 127 and 128 according to the motion vector of a half or quarter pixel unit received from the VLD portion 20; and a second buffer 130 for temporarily storing the signal interpolated by the second interpolating portion 129, and generating it to the second adding portion 130.

The operation of the simplicity HDTV video decoder according to the present invention will be described as follows.

When an input video format is an interlaced scanning type image with highest bandwidth of 1920×1080, 30 MHz, the sampling frequency is 1920×1080×1.5×30, that is, above 93 MHz.

The output frequency of the simplicity decoder is about 50 MHz because it can reduce the horizontal resolution by half through the 8×4 IDCT portion.

Since the frequency speed is equal to the access time of a current DRAM about 60 to 70 ns, input signals must be divided into luminance and color difference signals for the purpose of their parallel processing. The parallel processing speed in an active region would be about 960×1056×30, 30 MHz for the luminance signal, and 15 MHz for the color difference signal.

An input bit stream received through a channel is restored by the VLD portion 20, divided into a luminance signal and a color difference signal.

First, the luminance signal transferred from the VLD portion 20 is reverse-quantized by the first reverse quantizing portion 30 according to the quantization value. The reverse-quantized count number is then restored into the luminance signal through a reverse DCT conversion in the unit of 8×4 blocks by the first IDCT portion 40, transferred to the first adding portion 50.

The first adding portion 50 combines the luminance signal transferred from the first IDCT portion 40 and the motion-compensated signal from the first motion compensating portion 60, restoring it into a complete luminance signal.

The luminance signal transferred from the first adding portion 50 is finally scanned by the first scanning portion 70 in the unit of lines.

The luminance signal from the first adding portion 50 is then stored in the first motion compensating portion 60 and motion-compensated according to the motion vector transferred from the VLD portion 20. It is transmitted to the first adding portion 50.

In the same manner of the luminance signal, the color difference signal, processed in the second reverse quantizing portion 80 and the second 8×4 IDCT portion 90, is stored in the second motion compensating portion 120, added to the motion-compensated signal by the second adding portion 100, and scanned in the unit of lines by the second scanning unit 110.

In the first and second motion compensation unit 60 and 120, the luminance signal and the color difference signal are processed in the unit of macro blocks, vertically in the unit of a half pixel and horizontally in the unit of a quarter pixel.

Figure 5A:
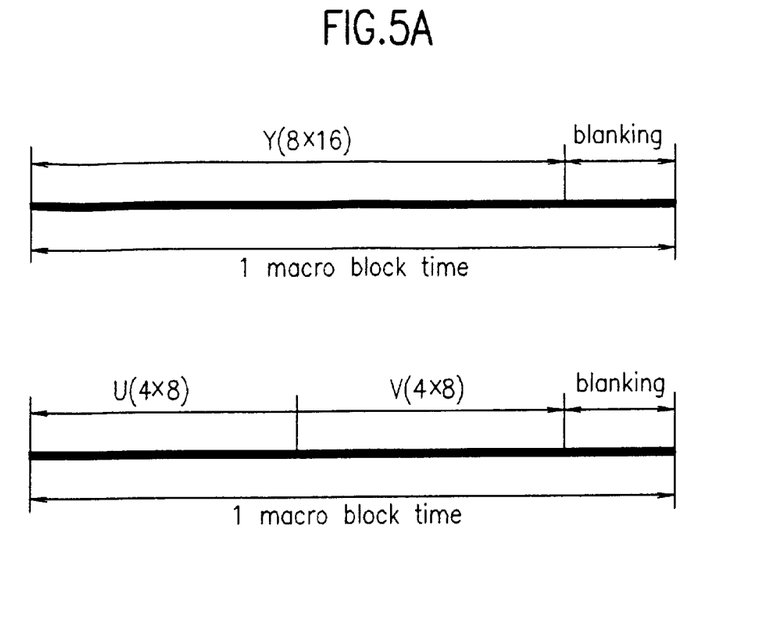
FIGS. 5a and 5b illustrate a macro block and frame for a motion compensation in accordance with the present invention.
Figure 5B:
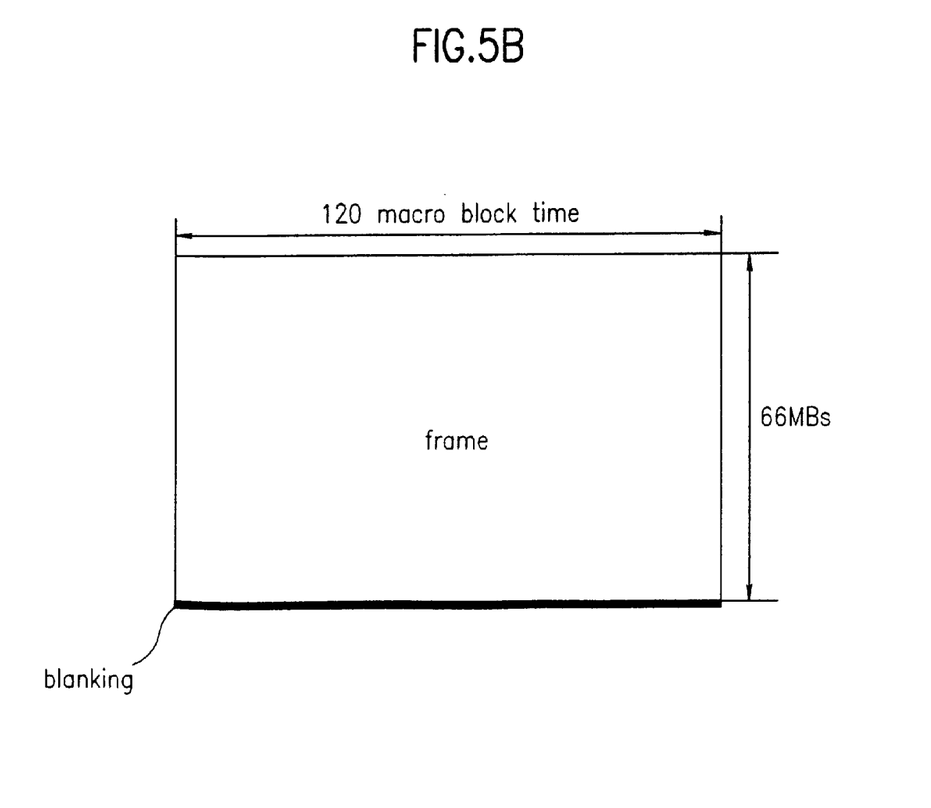

To secure the signal processing time in the unit of frames and macro blocks, both of the luminance signal and the color difference signal have blanking time for a delay of motion compensation in a macro block unit, as shown in FIG. 5a, and in a frame unit, as shown in FIG. 5b.

To synchronize the luminance signal and the color difference signal, the operational frequency of the color difference signal is regulated to be half that of the luminance signal.

As for the luminance signal, since the output speed of the first adding portion 50 is about 40 MHz with the access time of a general DRAM approximately 60 ns, the 8×4 register 601 combines the 8-bit signals transferred from the first adding portion 50 by 4 pixels, storing 32-bit signals in the first and second three-state buffers 602 and 603.

The 32-bit signals stored in the first and second tthree-statebuffers 602 and 603 are concurrently written in two DRAMs through a 16-bit data bus of the first or second frame memory 604 or 605 into which a write control signal of the first address generating portion 611 is alternatively entered.

At the same time, a read control signal, generated by the first address generating unit 611, is transferred into the other frame memory having no write control signal received, reading the luminance signal stored in the two DRAMs and transmitted to the first selection unit 606.

The first and second frame memories 604 and 605 alternately generate their output signal to the first selection unit 606 in the unit of frames.

To decode a first frame, one of the first and second frame memories 604 and 605 reads the frame and generates it to the first selection unit 606, while the other frame memory writes the signal fed into the first and second three-state buffers 602 and 603.

To decode a second frame, the frame memory, that wrote the input signals of the first and second three-state buffers 602 and 603 in the first frame's decoding, reads the signals and transfers them to the first selection unit 606. At the same time, the other frame memory, that read the signal currently fed into the first and second three-state buffers 602 and 603 in the first frame's decoding, writes the signals.

Figure 6A:
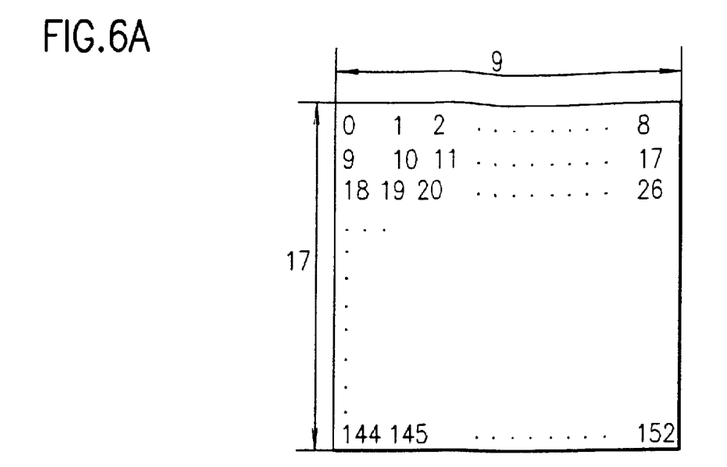
FIG. 6a shows a macro block for a motion compensation as in FIGS. 3 and 4.
Figure 6B:
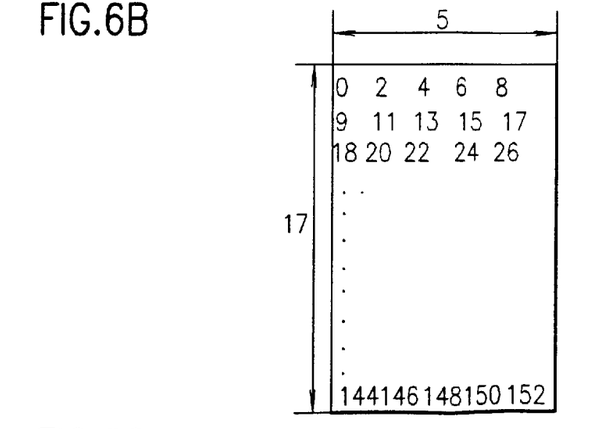
FIGS. 6b and 6c shows the content stored in the SRAM in FIG. 3 and 4.
Figure 6C:
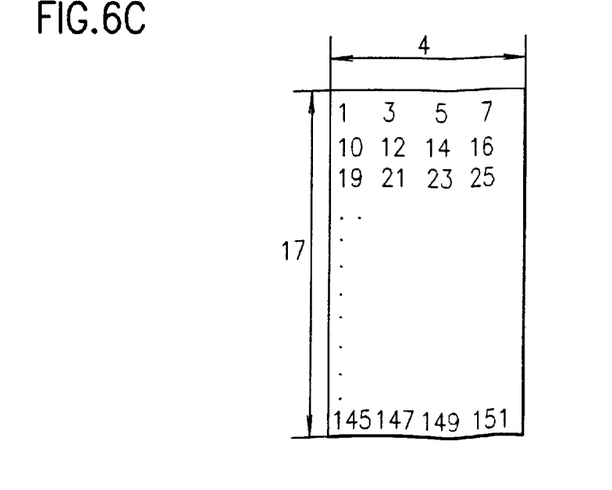

For the purpose of a motion compensation of 17×17 pixels, as shown in FIG. 6a, in the unit of macro blocks by a half or quarter pixel, the first selection unit 606 divides the signals transferred from the first or second frame memory 604 or 605 into pixels of even and odd number addresses that are horizontally arranged in the first and second SRAMs 607 and 608, as shown in FIGS. 6a and 6b.

It should be noted that the signals are temporarily stored in the first and second SRAMs 607 and 608 before a motion compensation because the DRAMs of the first and second frame memories 604 and 605 cannot process the signals at a wanted speed of processing for the motion compensation.

The signals divided and stored in the first and second SRAMs 607 and 608 are vertically scanned and generated to the first interpolation unit 609.

If required, a vertical line is read two times for the interpolation of adjacent horizontal pixels.

Figure 7A:
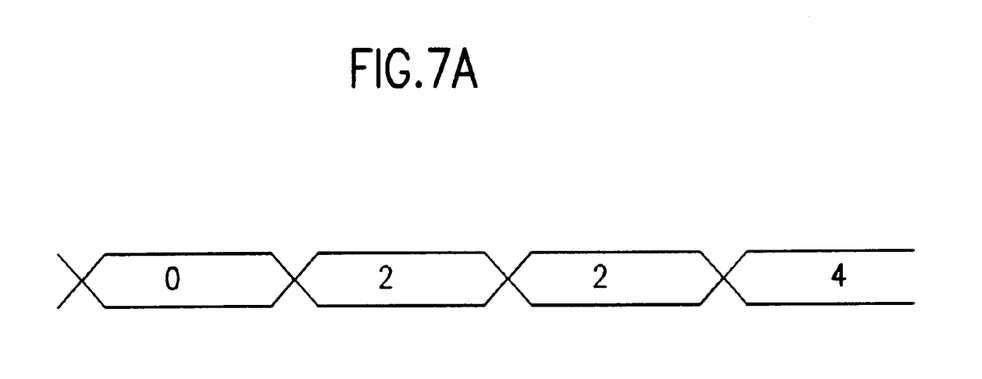
FIG. 7a is a waveform diagram of the output of first and third SRAMs in FIGS. 3 and 4.
Figure 7B:
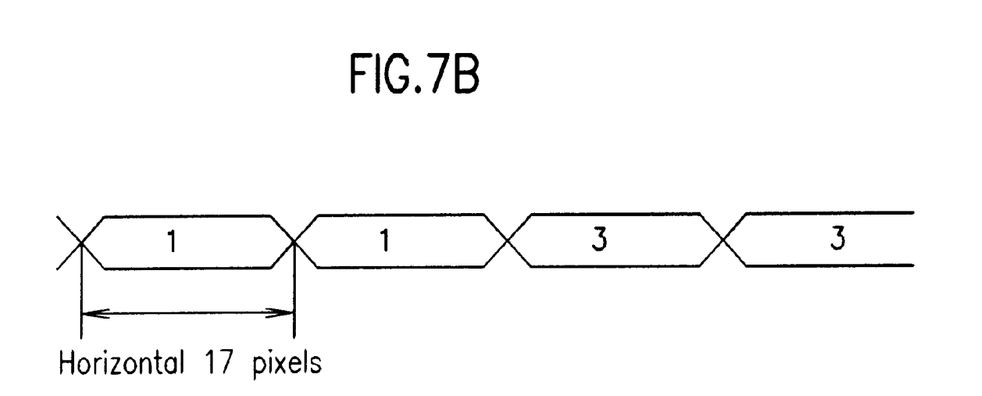
FIG. 7b is a waveform diagram of the output of second and fourth SRAMs in FIGS. 3 and 4.

To described this in more detail, as shown in FIGS. 7a and 7b, the first and second SRAMs 607 and 608 read the horizontally zero and first lines whose interpolations are available without a separate memory. When the horizontally second and third lines are read by the first and second SRAMs 607 and 608 and interpolated, the first and second lines cannot not be interpolated.

For that reason, to interpolate the first and second lines, the first SRAM 607 reads the next second line while the second SRAM 608 reads the first line again.

The first interpolation unit 609 receives the output signal of the first and second SRAMs 607 and 608 and the motion vector of a half or quarter pixel unit transferred from the VLD unit 20.

The output of the first interpolation unit 609 is stored and converted by the first buffer 610, and scanned in the unit of 8×4 blocks, transmitted the first adding portion 50.

As for the color difference signals, because the operation frequency of the color difference signal is half that of the luminance signal, they are stored in the 8×2 register 121 instead of 8×4 register 601, by 2 pixels in the unit of 16 bits.

The color difference signals are stored in one DRAM in the unit of 16 bits by the third and fourth frame memories 124 and 125, and processed by the second motion compensation unit 120 in the same manner as the luminance signals.

It will be apparent to those skilled in the art that various modifications and variations can be made in a simplicity HDTV video decoder and its decoding method of the present invention without departing from the spirit or scope of the invention. Thus, it is intended that the present invention cover the modifications and variations of this invention provided they come within the scope of the appended claims and their equivalents.

What is claimed is:

1. A simplicity HDTV video decoding decoder comprising:
   a variable length decoder unit for variable-length-decoding an input image signal and dividing the input image signal into a plurality of signals and a motion vector;
   a reverse quantization unit for reverse-quantizing one of the plurality of signals and outputting a reverse quantized coefficient;
   an 8×4 IDCT unit for reverse converting the reverse quantized coefficient and outputting a differential value;
   a motion compensation unit for motion compensating the motion vector and outputting a compensated frame; and
   an adding unit for combining the differential value and the compensated frame.

2. The simplicity HDTV video decoder as defined in claim 1, wherein the motion compensation unit comprises:
   an 8×4 bit register for storing a luminance signal, transferred from the adding portion, by 4 pixels;
   first and second three-state buffers for storing the signal of the 8×4 bit register;
   first and second frame memories for storing the output signal of the first or second three-state buffer, or generating the previous frame signal stored;
   a selection unit for selectively generating the output signal of the first or second frame memory into pixels of odd and even number addresses;
   first and second SRAMs for respectively storing the pixels of odd and even number addresses transferred from the selection unit;
   an interpolation unit for interpolating the pixels of odd and even number addresses, transferred from the first and second SRAMs, according to the motion vector generated by the variable length decoder unit; and
   a buffer for temporarily storing the interpolated luminance signal, and transferring it to the adding portion.

3. The simplicity HDTV video decoder as defined in claim 2, wherein the first and second three-state buffers store a 32-bit signal.

4. The simplicity HDTV video decoder as defined in claim 2, wherein the first and second frame memories comprise two DRAMs each of which stores a 16-bit signal.

5. A simplicity HDTV video decoding method comprising the steps of:
   variable-length-decoding an input image signal, and dividing it into a luminance signal, a color difference signal and a motion vector;
   reverse-quantizing the luminance and color difference signals received, and reverse-converting the luminance and color difference signals received to be half in horizontal size; and
   storing of the reverse-converted luminance and color difference signals in the unit of frames, and motion-compensating the reverse-converted luminance and color difference signals by using the motion vector.

6. A simplicity HDTV video decoding method as defined in claim 5, wherein the motion compensation comprises the steps of:
   storing the reverse-converted luminance signal by 4 pixels, buffering each of the 32-bit signals, and generating it;
   storing the 32-bit signals, generating the previous frame signal stored, and selectively generating the output signals into pixels of odd and even number addresses; and
   interpolating the pixels of odd and even number addresses according to the motion vector.

7. The simplicity HDTV video decoding method as defined in claim 5, wherein the motion compensation comprises the steps of:
   storing the reverse-converted color difference signal by 2 pixels, buffering each of the 16-bit signals, and generating it;
   storing the 16-bit signals, generating the previous frame signal stored, and selectively generating the output signals into pixels of odd and even number addresses; and
   interpolating the pixels of odd and even number addresses according to the motion vector.

* * * * *